United States Patent [19]

Sugawara

[11] 4,243,231
[45] Jan. 6, 1981

[54] GASKET REINFORCED BY GROMMET IN COMBINATION WITH GRAPHITE SHEET

[75] Inventor: Minoru Sugawara, Odawara, Japan

[73] Assignee: Ishino Gasket Mfg. Co., Ltd., Tokyo, Japan

[21] Appl. No.: 65,582

[22] Filed: Aug. 10, 1979

Related U.S. Application Data

[63] Continuation of Ser. No. 671,687, Mar. 29, 1976, abandoned.

[51] Int. Cl.³ .............................................. F16J 15/12
[52] U.S. Cl. .................................. 277/22; 277/235 B
[58] Field of Search ................ 277/22, 235 B, DIG. 6

[56] References Cited

U.S. PATENT DOCUMENTS

| 1,793,423 | 2/1931 | Fitzgerald | 277/235 B |
| 3,784,212 | 1/1974 | Doerfling | 277/22 |
| 3,841,289 | 10/1974 | Meyers | 277/235 B |

Primary Examiner—Robert I. Smith
Attorney, Agent, or Firm—DeLio and Montgomery

[57] ABSTRACT

A gasket providing superior sealing having a grommet inserted in its holes and a graphite sheet mounted in the narrow area between the two adjoining or adjacent holes is disclosed.

4 Claims, 5 Drawing Figures

GASKET REINFORCED BY GROMMET IN COMBINATION WITH GRAPHITE SHEET

This is a continuation of application Ser. No. 671,687, filed Mar. 29, 1976 and now abandoned.

BACKGROUND OF THE INVENTION

The present invention relates to a gasket reinforced by a grommet in combination with a graphite sheet and, particularly, to that of the type adapted for use on the cylinder head of an internal combustion engine.

Recently, for various reasons, for example, for compactness of design, multicylinder internal combustion engines have been manufactured with a very small distance between the cylinders. Accordingly, it is necessary that a grommet used in the cylinder bores of a cylinder head gasket having single or linked 8-shaped holes matching the peripheries of the cylinder bores be formed in one body. This structure of grommet has several disadvantages. For example, due to the pressing of the grommet face during assembly of the grommet in the gasket, and, also, deterioration of the gasket caused by the heat of combustion when in use, there is distortion and non-uniform surface pressure on the gasket body or the portion thereof reinforced by the grommet thereby causing leakage of gas between the adjoining or adjacent cylinder bores resulting in loss of sealing function as a gasket.

Accordingly, an object of the present invention is to provide a gasket reinforced by a grommet in combination with a graphite sheet, which is free from the disadvantages described hereinabove and is capable of functioning efficiently as a gasket even when the area between the adjoining or adjacent cylinder bores is narrow.

Another object of the present invention is to provide a gasket reinforced by a grommet in combination with a graphite sheet of a type particularly suitable for use on the cylinder head of a multicylinder internal combustion engine.

SUMMARY OF THE INVENTION

The present invention is characterized in that a graphite sheet is mounted on the area between the adjoining or adjacent holes of a gasket, for example, the portion between the adjoining bores of the cylinder head of an internal combustion engine, particularly when said area is narrow and high sealing is required.

The term "graphite sheet" as used in this specification and claims is to be understood to generally refer to such materials as pure graphite formed in sheets (for example "Grafoil" produced by Union Carbide Company), graphite powder compression molded into sheets, and carbon sheets in general. Such a graphite sheet has a lamellar chrystalline structure and is known to have excellent thermal conductivity (about 80% that of copper) and dimensional stability in the planar direction (or horizontal axial direction) of the sheet and a good heat insulation and thermal expansion and a superior elasticity (10% to 15% compression ratio) in the direction normal to the sheet face (normal axial direction).

BRIEF DESCRIPTION OF THE DRAWINGS

These and other objects and features of the present invention will become apparent to those skilled in the art by the description of preferred embodiments of the present invention with reference to the accompanying drawings in which.

DESCRIPTION OF THE PREFERRED EMBODIMENTS

Figure 1:
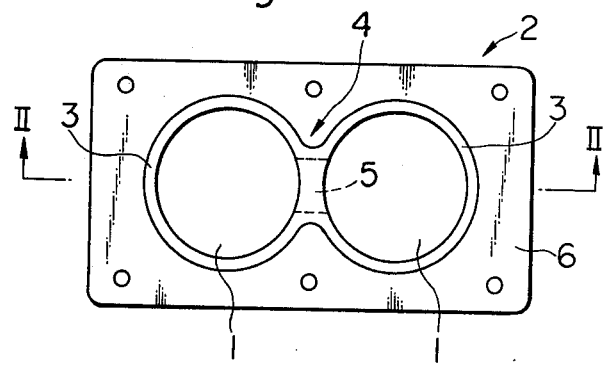
FIG. 1 is a plan view of an embodiment of the gasket according to the present invention.

Preferred embodiments of the gasket according to the present invention will now be described with reference to the accompanying drawings. FIG. 1 shows an embodiment of the gasket 2 having two adjoining holes 1 about which is inserted a metal grommet 3. In an area 4 between the two adjoining holes is mounted a graphite sheet 5.

The graphite sheet 5 is mounted in position through the following steps: a hole for the graphite sheet 5 is made during cutting and punching of a gasket base sheet 6, the sheet 5 is inserted in the hole, then the sheet 5 is secured to the gasket base sheet 6 with the grommet 3.

Figure 2:
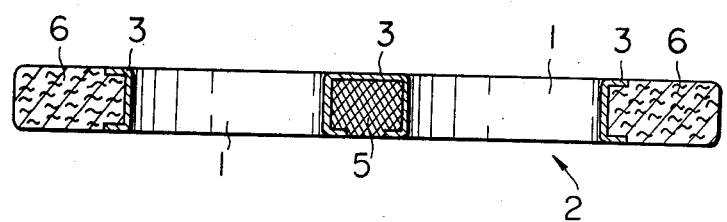
FIG. 2 is an enlarged sectional view taken along the line II—II of FIG. 1.

FIG. 2 is an enlarged sectional view of an example of the gasket thus formed taken along the line II—II of FIG. 1. As illustrated, the graphite sheet 5 is covered by the grommet 3 and secured thereby to the gasket base sheet 6.

Figure 3:
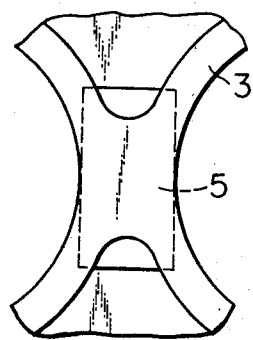
FIG. 3 is an enlarged fragmentary plan view of another form of the graphite sheet.

The dimensions and shape of the graphite sheet 5 are selected according to the dimensions and shape of the area 4 between the adjoining holes 1. While the graphite sheet 5 is shown in Figure to be embedded in the grommet 3, the sheet 5 may be mounted protruding in part beyond the grommet 3 as shown in FIG. 3.

Figure 4:
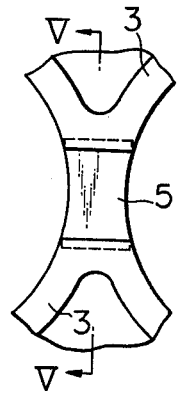
FIG. 4 is an enlarged fragmentary plan view of another embodiment of the present invention.
Figure 5:
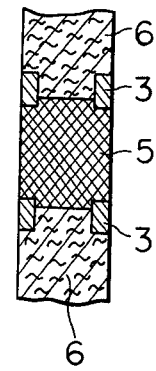
FIG. 5 is an enlarged fragmentary sectional view taken along the line V—V of FIG. 4.

FIG. 4 shows another embodiment of the present invention, and FIG. 5 is an enlarged fragmentary sectional view taken along the line V—V of FIG. 4. As illustrated therein, in this embodiment the grommet 3 is cut off in part so that the graphite sheet 5 is exposed on the surface of the gasket 2 in the area 4 between the adjoining holes. In this structure, the graphite sheet 5 is caulked in the area contiguous to the gasket base sheet 6 by the grommet 3 and securely mounted to the area 4 between the adjoining holes so as not to get loose and fall from the base sheet 6.

As described hereinbefore, since the graphite sheet has good properties such as heat insulation, heat expansibility and elasticity in normal axial direction and heat conductivity and dimensional stability in horizontal axial direction, it exhibits an excellent resistance to deterioration by heat even when used in a narrow area such as the area between the adjoining holes. Graphite sheet is expensive, but, according to the present invention, the desired effect is obtained with a minimum quantity of the graphite sheet.

Although only a few specific embodiments of this invention have been described it should be understood that various modifications may be made without departing from the scope of this invention which is defined by the appended claims.

What is claimed is:

1. A gasket reinforced by grommet in combination with a graphite sheet, comprising:

a gasket base sheet with a plurality of holes and having the area between adjoining holes cut out;

a graphite sheet mounted in said cut out area between the adjoining holes and having a lamellar crystalline structure; and a grommet mounted on the peripheral edge of said holes and attached to said graphite sheet.

2. A gasket as set forth in claim 1, wherein said graphite sheet is entirely embedded in said grommet.

3. A gasket as set forth in claim 1, wherein said graphite sheet is mounted protruding in part beyond the grommet.

4. A gasket as set forth in claim 1, wherein said grommet is cut off in part so that part of said graphite sheet is exposed in said area between the adjoining holes.

* * * * *

UNITED STATES PATENT AND TRADEMARK OFFICE
CERTIFICATE OF CORRECTION

PATENT NO. : 4,243,231
DATED : January 6, 1981
INVENTOR(S) : Minoru Sugawara

It is certified that error appears in the above—identified patent and that said Letters Patent is hereby corrected as shown below:

The term of this patent subsequent to Oct. 6, 1996 has been disclaimed.

Signed and Sealed this

Second Day of March 1982

[SEAL]

Attest:

Attesting Officer

GERALD J. MOSSINGHOFF

Commissioner of Patents and Trademarks